United States Patent Office 3,463,620
Patented Aug. 26, 1969

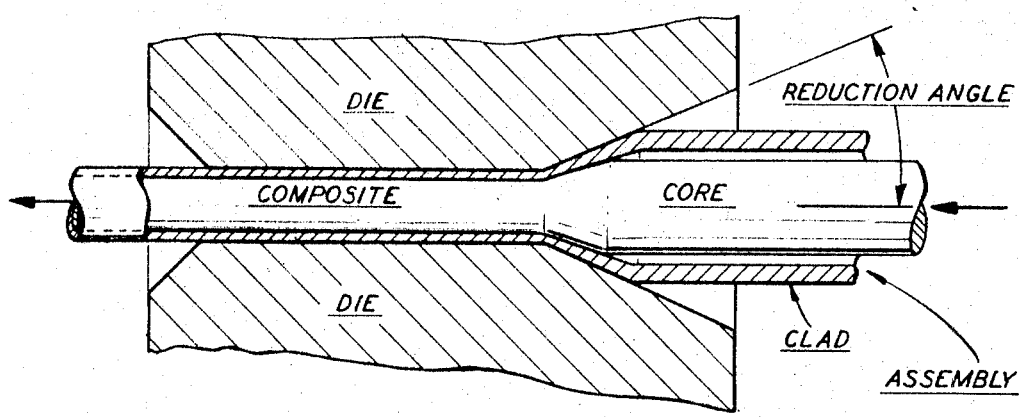

3,463,620
CYLINDRICAL OR ROD-LIKE COMPOSITE ARTICLE
Joseph Winter, New Haven, Conn., assignor to Olin Mathieson Chemical Corporation, a corporation of Virginia
Continuation-in-part of application Ser. No. 565,664, May 23, 1966, which is a division of application Ser. No. 229,262, Oct. 2, 1962. This application Feb. 28, 1968, Ser. No. 708,935
Int. Cl. B21c 37/00; B23p 3/20
U.S. Cl. 29—183.5     8 Claims

ABSTRACT OF THE DISCLOSURE

The instant disclosure teaches a process for obtaining a high strength cylindrical or rod-like composite material which may be either a clad solid rod or a clad hollow tube and the improved cylindrical or rod-like composite article obtained thereby. In particular, the process comprises forming an assembly by placing one component inside another component and reducing the assembly diameter from 10 to 70% by rotary swaging.

---

This application is a continuation-in-part of U.S. Patent Application Ser. No. 565,664, filed May 23, 1966, now U.S. Patent 3,397,045, which in turn is a divisional of U.S. patent application Ser. No. 229,262, filed Oct. 2, 1962, now abandoned.

The present invention relates to the preparation of composite cylindrical or rod-like articles having a high bond strength. These materials may be either a clad solid rod or a clad tubular material.

Composite cylindrical or rod-like materials are highly desirable commercially due to the fact that the behavior characteristics of the core and cladding may be obtained in one composite article. In a single alloy, frequently many properties cannot be greatly modified by alloying or thermal treatments. However, by forming composites apparent properties of the cladding can be generated while retaining the bulk properties of the core material. In this manner, one can often obtain greatly modified and highly desirable properties over the single alloy.

Composite articles are highly desirable in applications while require cylindrical or rod-like materials. For example, composite materials have application in electrical wires and cables as well as clad rods for structural applications. Composite hollow tubing will find applications in heat exchange fields where, for example, different properties are desired on the inside and outside of the tubing. Many other applications for composite cylindrical or rod-like materials exist, such as soldering, brazing, transition tubes, saving of costly or strategic metal, for example, copper clad aluminum wire to replace copper.

Commercially available processes, however, have found difficulty in forming clad cylindrical or rod-like materials. Commercially available processes suffer one or more serious shortcomings. For example, often the bond strength between the components is relatively low, thus limiting the fields of use. In addition, commercial processes frequently obtain non-uniform cladding thickness. Still further, art processes are often expensive and inconvient to operate.

A typical art process mechanically interlocks the components, as by pushing something through a tube. This generally achieves a poor bond. Another art process is diffusion bonding which thermally treats the components and forms an intermetallic phase. This results in possible porosity if diffusion rates are greatly different and limits the applicability of the process. The cast-on or hot dip process is expensive and is limited with respect to the thickness of the cladding. Electroplating results in thin claddings with pin holes or discontinuities. In addition, the foregoing processes are also accompanied by other significant limitations.

Accordingly, it is a principal object of the present invention to provide a process for obtaining a composite cylindrical or rod-like article and an improved cylindrical or rod-like composite obtained thereby.

It is a still further object of the present invention to provide an article and process as aforesaid which is convenient and economical to operate.

It is an additional object of the present invention to provide a process and article as aforesaid which obtains a high strength composite product characterized by a relatively uniform cladding thickness.

Further objects and advantages of the present invention will appear hereinafter.

In accordance with the present invention the foregoing objects and advantages are readily achieved and a process is provided for obtaining a high strength composite tubular structure.

The process of the present invention is characterized as follows:

(A) providing a cylindrical or rod-like metal core as a first component;

(B) providing a dissimilar hollow tubular metal cladding as a second component;

(C) forming an assembly by placing one of said components inside the other of said components, preferably loosely; and (D) reducing the assembly diameter from 10 to 70% by rotary swaging while said components are in direct face-to-face contacting relationship, wherein the reduction angle is between 1° and 30°; thereby forming a high strength tubular composite material.

In accordance with the present invention, a high strength composite cylindrical or rod-like material is provided. The composite cylindrical or rod-like article has a metal core and a dissimilar metal cladding. The interface between the core and cladding is characterized by the absence of atomic interdiffusion, i.e., the absence of a visible, atomic interdiffusion band, and is further characterized by having a wave-like interface, with the interface having at least 20% greater surface contact area than the interface of an unbonded assembly having the same dimensions.

The present invention will be more readily apparent from a consideration of the following specification wherein the drawing is a schematic illustration of the process of the present invention.

In accordance with the process of the present invention, the core may be either a solid rod-like material or a hollow tubular material. In the event that the core is a rod-like material, the starting diameter of the core is less than 4 inches and preferably less than 2.5 inches.

In the embodiment of the present invention utilizing the solid rod-like core, the cladding should preferably comprise less than 50% of the total composite and optimally less than 20% of the total composite. One or more claddings may, of course, be used. Naturally, the wall thickness of the cladding material will vary depending upon the metals used and the results desired. In general, however, the wall thickness of the cladding material should be less than 2.5 inches and preferably less than one inch.

In the embodiment of the present invention utilizing a hollow tubular material as the core, the maximum outside diameter of the core material should be 6 inches and preferably 2 inches. In this embodiment, the core-clad thickness relationship can be varied in almost any way depending upon the desired results. The cladding may be the inside layer, the outside layer, both sides, or a plurality of layers on one or both sides.

More than two metals may be used depending upon the particular application, both in the hollow tube and solid rod embodiment.

Where a hollow material is used as the core, a solid mandrel is inserted inside the core prior to the swaging operation of the present invention. Naturally, a lubricant is inserted at the interface between the mandrel and core in order to prevent the core from bonding to the mandrel.

The materials which may be used in the process and composite of the present invention are preferably selected from the following group: aluminum, copper, iron, titanium, nickel, zinc, magnesium, refractory metals, including tantalum, columbium, molybdenum, etc., or base alloys of the foregoing materials.

If desired in a commercial operation, one may start with strip material and form welded tubing as a step in a continuous process. The strip may be passed through forming rolls or dies, welded to form welded tubing and processed in accordance with the present invention.

An assembly is formed between the core and cladding by placing one component inside the other, preferably placing the core inside the cladding. If the cladding is to be the inside component of a hollow composite tube, then the cladding is placed on the inside.

It is a particular advantage of the present invention that it is unnecessary to utilize bonding aids, such as a thin coating of a dissimilar metal, in order to effect the strongly adherent bond of the present invention. This enables a direct face-to-face bond between the core and cladding, eliminates the expense of a bonding aid, and results in a direct metallurgical bond between the core and cladding.

The starting materials, both core and cladding, can be in any temper or condition, hard or soft. Surface oxides are generally no handicap to the process of the present invention. This is quite surprising and is a significant advantage of the present invention since conventional processing must remove gross surface oxides prior to the formation of the composite. In fact, conventional processing frequently forms composites in special atmospheres so that one cannot form surface oxides prior to the formation of the composite. These special precautions are not required in the present invention.

It is, however, highly desirable to remove dirt or adhering lubricant from the surface of the metal prior to the process of the present invention in order to assure good contact between the core and the cladding materials. Any conventional cleaning processes may be readily employed, for example, the core and cladding materials may be passed through a soap or a detergent solution in accordance with conventional procedures. Examples of such cleaning procedures include the use of commercial alkaline or acid cleaners and solvent cleaners, such as carbon tetrachloride and trichloroethylene, or mechanically cleaning by abrading, such as grinding, wire brushing, sand blasting, etc.

In addition, it is also preferred, although not essential, to mechanically roughen at least one of the bonding surfaces prior to formation of the bonding assembly in order to aid the bonding step.

After the assembly is formed, it is preferred to seal one end of the cladding around the core in order to prevent lubricant from entering the core-clad interface.

It is not necessary to heat the components prior to bonding, although one or both components may be heated, if desired.

The core-clad assembly is then bonded together by rotary swaging. Rotary swaging may be defined as a multiplicity of hammer-like blows or forging blows in line with the diameter of the assembly around the periphery of the workpiece. The swaging may consist of discrete blows, i.e., one or more hammer or forging tools that go around the periphery or a plurality of simultaneous hammer-like or swaging blows. The rotary swaging of the present invention includes spinning the assembly and reducing the diameter from a single point or single tool while the assembly spins. In other words, either the assembly or the workpiece can be rotating, but one must be rotating and one must be essentially fixed and there must be the aforementioned multiplicity of hammer-like blows.

The swaging results in the bonding of the core and cladding and the magnitude of the swaging force must be such to reduce the assembly diameter from 10 to 70% and preferably from 20 to 60%. The interfacial periphery between the core and cladding is also reduced.

In the swaging step, the reduction angle is between 1° and 30°. The reduction angle is the angle at which work is being done. It is defined by the angle between the exit and inlet material and is the angle made by the center line with the working face of the die. This is clearly shown in the drawing which forms a part of the present specification. The reduction angle should vary between 1° and 30° and preferably between 2° and 15°.

When a ductile cladding material is used, such as aluminum, the higher the reduction level the thinner the resulting cladding and the shallower the reduction angle the thicker the resulting cladding. Thus, control of final cladding thickness can be accomplished by control of process variables as well as starting material geometry.

It is preferred that the assembly be continuously rotary swaged at a feed rate of between 1 and 60 feet per minute, and preferably at a feed rate between 5 and 25 feet per minute. In general, if the cladding is a ductile material, such as aluminum, the higher the feed rate the thicker the cladding and the slower the feed rate the thinner the cladding.

With a more ductile cladding than core, the cladding can extend faster than the core and thus, initially the cladding should be shorter than the core.

Reference should be had to the drawing of the present invention which illustrates the embodiment using a solid rod-like core material. In this figure, the core and cladding are fed into the die and the assembly diameter, as well as the interfacial periphery between the core and cladding, is reduced to the desired degree by rotary swaging. The result is a firmly bonded cylindrical or rod-like composite material.

After the formation of the composite cylindrical or rod-like material, subsequent operations may be performed as desired. For example, the material may be drawn, rolled, swaged or fabricated into shapes or in general treated in accordance with conventional procedures.

A further advantage of the present invention is that subsequent to the bonding operation the composites of the present invention do not require subsequent diffusion anneals, i.e., conventional processing frequently requires diffusion anneals to secure the bond between core and cladding. The fact that the present invention does not require diffusion anneals is particularly significant since diffusion anneals might and frequently do cause blisters and promotes the formation of brittle intermetallic compounds or the like due to the long treatment times required at elevated temperatures. In addition, co-diffusion of gases to the interface can occur as well as condensation of vacancies and the formation of gross intermetallic compounds between the core and cladding.

In fact, subsequent to the bonding operation no further operations whatever are required. The composites of the present invention are provided in commercial form ready to be used for the desired application. It may naturally be desirable to perform conventional subsequent operations for particular applications, such as those described hereinabove. In addition, one may perform short thermal treatments for stress relief or the attainment of desired properties, e.g., a short heat treating anneal or aging treatment.

The bond strength between the core and cladding has been found to be exceptionally high and in general, impact fracture and tensile tests show that fracture will occur continuously across the composite with no core-clad separation along the fracture surface.

The composite articles of the present invention are characterized by excellent physical properties, very high bond strengths and the absence of products of atomic interdiffusion between base metal and cladding, which interdiffusion may result in the formation of brittle compounds. The present invention achieves these surprising advantages by means of a simple and convenient process and without the use of expensive devices such as are frequently employed in the art.

The present invention will be more readily understandable from a consideration of the following illustrative examples.

EXAMPLE I

This example illustrates the formation of a clad rod in accordance with the present invention. The core was a C1040 steel rod having a composition as follows: carbon, 0.37 to 0.44%; manganese, 0.60 to 0.90%; phosphorus, 0.040% max.; sulfur, 0.050% max.; balance essentially iron. The steel rod had a diameter of 0.562 inch. The cladding was a hollow tube of aluminum alloy 1100 having a composition as follows: silicon plus iron, 1.0% max.; copper, 0.05 to 0.20%; manganese, 0.05% max.; zinc, 0.10% max.; others, each 0.05% max., total, 0.15%; balance essentially aluminum. The cladding had an outside diameter of 0.720 inch and 0.062 inch wall thickness.

The materials were cleaned in the following manner: The steel rod was sand blasted and wire brushed in a longitudinal direction and the aluminum cladding was hot caustic dipped, water rinsed, nitric acid dipped, rinsed and dried.

An assembly was formed by loosely placing the core inside the cladding and bonding by rotary swaging as shown in the figure which forms a part of the present specification. The core and cladding were bonded together by rotary swaging using dies located in a hollow spindle rigidly fixed to a flywheel. The spindle was rotated at about 180 r.p.m. As the spindle rotated, centrifugal force acted on the dies causing them to open and the dies remained open until forced to close by impingement upon a series of hammer rolls centered in a cage about the spindle. In the foregoing example there were twelve (12) hammer blows per revolution of the spindle. The reduction angle was 7 degrees and the feed rate was one foot per minute.

The resultant composite was firmly bonded and had a diameter of 0.500 inch corresponding to a 48% reduction in area and a reduction of assembly diameter of about 30%. The reduction in area of the core was 82% and the cladding was 29%.

The composite was subjected to impact fracture tests which showed that fracture occurred continuously across the composite with no core-clad separation along the fracture surface.

The core-clad interface was examined microscopically and there was no visible atomic interdiffusion band. The interface was characterized by having a wave-like configuration with at least 20% greater surface contact area than the interface of an unbonded assembly having the same dimensions.

EXAMPLE II

This example illustrates the formation of a clad hollow tube in accordance with the present invention. The core was a hollow tube of C1015 steel having a composition as follows: carbon, 0.13 to 0.18%; manganese, 0.30 to 0.60%; phosphorus, 0.040% max.; sulfur, 0.050% max.; balance essentially iron. The core had an outside diameter of one (1) inch and 0.049 inch wall thickness. The cladding was a hollow tube of copper alloy 194 having the following composition: iron, 2.1 to 2.6%; phosphorus, up to 0.040%; balance essentially copper. The cladding had an outside diameter of ⅞ inch and 0.049 inch wall thickness.

A composite, hollow tube was formed in a manner after Example I using a solid rod as a mandrel in accordance with the foregoing specification. In this example the reduction angle was 7 degrees and the feed rate was one foot per minute.

The resultant composite was firmly bonded, had an outside diameter of ¾ inch and an inside diameter of 0.670 inch, with the reduction in assembly diameter being 25%.

The composite was subjected to impact fracture tests which showed that fracture occurred continuously across the composite with no core-clad separation along the fracture surface.

The core-clad interface was examined microscopically and there was no visible atomic interdiffusion band. The interface was characterized by having a wave-like configuration with at least 20% greater surface contact area than the interface of an unbonded assembly having the same dimensions.

EXAMPLE III

As a comparative example, Example I was repeated without rotary swaging. The materials were drawn through a series of drawing dies having a progressively reduced diameter, with the last die in the series having a diameter of 0.500 inch. The result was a tight mechanical fit, but the materials were readily separable and the core and cladding independently fractured upon impact fracture test.

EXAMPLE IV

A tube of aluminum alloy 1100 was prepared by impact extruding to have a wall thickness of about 0.005 inch and an outside diameter of about 0.250 inch. A similar tube of copper was prepared by impact extrusion to have a corresponding wall thickness of 0.005 inch and an outside diameter of 0.250 inch. These tubes were annealed at one end and then side stabbed to expand the annealed end into a larger diameter tubular end portion and a generally conical section between the expanded end and the main body of the tube. The outside diameter of the end portion of each tube was approximately 0.375 inch and its length was between about a quarter and a half inch. Both the copper and aluminum tubes were expanded so that the final inside dimension of the expanded end of the copper tube was 0.375 and the outside dimension of the expanded portion of the aluminum tube was 0.375. Thus, the two tubes were assembled prior to bonding by insertion of the expanded portion of the aluminum tube into the expanded portion of the copper tube.

These two tubes were then cleaned and etched by conventional practices. The copper tube was cleaned by immersion in dilute nitric acid and the aluminum tube by immersion in caustic solution after which each was thoroughly rinsed with tap water and dried. The expanded outside surface of the aluminum tube was roughened without deforming the tube by working with a hand held file. The clean dried tubes were then assembled to provide the roughened outer surface of the aluminum in contact with the inner surface of the copper tube at the respective expanded portions thereof. A steel rod of one-quarter inch outside diameter was inserted through the joined tubes to serve as a mandrel and the assembly was mounted in the chuck of a high speed lathe to grip the copper tube between the chuck and mandrel and to support the remote end of the mandrel in a tail stock. Prior to mechanically working the assembly, machine oil was applied to the external surfaces of the assembled tubes.

The mandrel and assembled tubes were then set in rotary motion at a high speed of approximately 1200 to 1500 r.p.m. This rotational speed was selected to correspond, on a tube of the given dimensions, to a linear rate of movement of the copper-aluminum intersurface of approximately 150 feet per minute. The assembled enlarged ends of the tubes were then worked mechanically by application of a single point, non-cutting tool which was blunt at its working contact. The tool consisted of a hardwood desk ruler which was supported on the carriage of the lathe as a fulcrum support and was urged upward at its working end against the lower side of the rapidly rotating tube and mandrel assembly by hand pressure exerted downward at the remote portion of the ruler. The angle of contact between the center line of the rotating workpiece and the working end of the ruler defines the reduction angle and was about 15°. In working the expanded portion of the tube assembly, the ruler served as a spinning tool and was pivoted about its point of fulcrum support to advance the metal working edge of the ruler into and along the expanded portion of the tube assembly to complete the spinning operation in a period of less than ten seconds. In order to bring the working edge into contact with the entire expanded surface of the tubes, the tool was first applied at the expanded portion of the copper tube and it was moved along the length of this expanded portion and then onto the expanded portion of the aluminum tubes to work them into contact with the surface of the steel mandrel. The final diameter of the spun area of the composite was approximately equivalent to that of the starting dimensions of the aluminum and copper tubes.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A high strength swaged composite cylindrical or rod-like article having a cylindrical or rod-like metal core and a dissimilar cylindrical or rod-like metal cladding integrally metallurgically bonded thereto with a high bond strength in direct face-to-face contact, with the interface between the core and cladding being characterized by the absence of atomic interdiffusion with said interface being further characterized by having a wave-like configuration and at least 20% greater surface contact area than an unbonded assembly having the same dimensions.

2. An article according to claim 1 wherein said core and cladding are dissimilar metals selected from the group consisting of aluminum, iron, copper, titanium and base alloys thereof.

3. An article according to claim 1 wherein said core is a solid rod.

4. An article according to claim 1 wherein said core is a hollow tubular material.

5. An article according to claim 1 wherein greater than one dissimilar cladding is employed.

6. An article according to claim 4 wherein said cladding is the outermost layer.

7. An article according to claim 1 wherein said core is a solid rod having a diameter of less than 2.5 inches and wherein said cladding has a wall thickness of less than one inch.

8. An article according to claim 4 wherein said core diameter has a maximum outside diameter of less than 2 inches.

References Cited
UNITED STATES PATENTS

| | | | |
|---|---|---|---|
| 2,224,346 | 12/1940 | Hobrock | 29—191.6 |
| 3,140,537 | 7/1964 | Popoff | 29—497.5 X |
| 3,182,392 | 5/1965 | Neal et al. | 29—421 |
| 3,397,045 | 8/1968 | Winter | 29—191 |

L. DEWAYNE RUTLEDGE, Primary Examiner

G. K. WHITE, Assistant Examiner

U.S. Cl. X.R.

29—191.6, 196.2, 196.3, 198, 497.5